United States Patent
Bhide et al.

(10) Patent No.: US 10,785,342 B1
(45) Date of Patent: Sep. 22, 2020

(54) STORING PACKET DATA IN MIRROR BUFFER

(71) Applicant: Barefoot Networks, Inc., Santa Clara, CA (US)

(72) Inventors: Parag D. Bhide, San Ramon, CA (US); Alain Loge, South Lake Tahoe, CA (US); Chaitanya Kodeboyina, Los Altos, CA (US); Anurag Agrawal, Santa Clara, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/289,001

(22) Filed: Feb. 28, 2019

Related U.S. Application Data

(63) Continuation of application No. 15/161,263, filed on May 22, 2016, now Pat. No. 10,230,810.

(60) Provisional application No. 62/310,608, filed on Mar. 18, 2016.

(51) Int. Cl.
*H04L 29/08* (2006.01)
*H04L 29/06* (2006.01)

(52) U.S. Cl.
CPC ...... *H04L 67/2842* (2013.01); *H04L 67/2804* (2013.01); *H04L 69/22* (2013.01)

(58) Field of Classification Search
CPC .. H04L 67/2842; H04L 67/2804; H04L 69/22
See application file for complete search history.

(56) References Cited

U.S. PATENT DOCUMENTS

| | | | |
|---|---|---|---|
| 8,976,791 B1 | 3/2015 | Sivan et al. | |
| 9,537,793 B2 | 1/2017 | Kapadia et al. | |
| 10,135,734 B1* | 11/2018 | Singh | H04L 45/7453 |
| 10,230,810 B1 | 3/2019 | Bhide et al. | |
| 2004/0022239 A1 | 2/2004 | Bosshart | |
| 2004/0208163 A1 | 10/2004 | Patel et al. | |
| 2005/0147042 A1* | 7/2005 | Purnadi | H04W 36/02 370/236 |
| 2005/0276230 A1* | 12/2005 | Akahane | H04L 43/00 370/252 |
| 2007/0183415 A1 | 8/2007 | Fischer et al. | |
| 2007/0195773 A1 | 8/2007 | Tatar et al. | |
| 2008/0168304 A1 | 7/2008 | Flynn et al. | |
| 2008/0247409 A1 | 10/2008 | Choudhury et al. | |
| 2008/0256183 A1 | 10/2008 | Flynn et al. | |

(Continued)

OTHER PUBLICATIONS

Non-Published commonly Owned U.S. Appl. No. 15/161,262, filed May 22, 2016, 41 pages, Barefoot Networks, Inc.

(Continued)

*Primary Examiner* — Hassan Kizou
*Assistant Examiner* — Deepa Belur
(74) *Attorney, Agent, or Firm* — Compass IP Law PC

(57) ABSTRACT

Some embodiments provide a method for a hardware forwarding element. Based on a set of characteristics of a packet, the method determines to copy a packet to a particular temporary storage of a set of temporary storages of the hardware forwarding element. Based on a property of the particular temporary storage, the method stores only a particular portion of the packet in the particular temporary storage. A same size portion of each packet copied to the particular temporary storage is stored in the particular temporary storage.

20 Claims, 12 Drawing Sheets

(56) References Cited

U.S. PATENT DOCUMENTS

| | | | |
|---|---|---|---|
| 2009/0109973 A1* | 4/2009 | Ilnicki | H04L 43/12 370/392 |
| 2010/0088756 A1 | 4/2010 | Balakrishnan et al. | |
| 2010/0232443 A1* | 9/2010 | Pandey | H04L 49/10 370/401 |
| 2011/0164509 A1* | 7/2011 | Wengrovitz | H04L 67/02 370/252 |
| 2011/0194557 A1 | 8/2011 | Baban et al. | |
| 2011/0289267 A1 | 11/2011 | Flynn et al. | |
| 2011/0296277 A1 | 12/2011 | Flynn et al. | |
| 2012/0140650 A1 | 6/2012 | Bruhn | |
| 2012/0179869 A1 | 7/2012 | Flynn et al. | |
| 2012/0230186 A1* | 9/2012 | Lee | H04L 43/028 370/230 |
| 2013/0067294 A1 | 3/2013 | Flynn et al. | |
| 2013/0097367 A1 | 4/2013 | Flynn et al. | |
| 2014/0241361 A1 | 8/2014 | Bosshart et al. | |
| 2014/0241362 A1 | 8/2014 | Bosshart et al. | |
| 2014/0244966 A1 | 8/2014 | Bosshart et al. | |
| 2014/0328180 A1 | 11/2014 | Kim et al. | |
| 2014/0328344 A1 | 11/2014 | Bosshart | |
| 2014/0334489 A1 | 11/2014 | Bosshart et al. | |
| 2014/0334819 A1 | 11/2014 | Mehrvar et al. | |
| 2015/0010000 A1 | 1/2015 | Zhang et al. | |
| 2015/0138976 A1 | 5/2015 | Lu et al. | |
| 2015/0139235 A1 | 5/2015 | Lu et al. | |
| 2015/0160879 A1 | 6/2015 | Flynn et al. | |
| 2015/0281131 A1* | 10/2015 | Bhat | H04L 45/50 370/230 |
| 2016/0080263 A1 | 3/2016 | Park et al. | |
| 2016/0216913 A1 | 7/2016 | Bosshart | |
| 2016/0301603 A1 | 10/2016 | Park et al. | |
| 2016/0330127 A1 | 11/2016 | Kim et al. | |
| 2017/0034058 A1 | 2/2017 | Sampath et al. | |
| 2017/0048312 A1 | 2/2017 | Moyer | |
| 2017/0126588 A1 | 5/2017 | Anand et al. | |
| 2017/0134538 A1 | 5/2017 | Mahkonen et al. | |
| 2017/0142011 A1 | 5/2017 | Zhang et al. | |
| 2017/0163538 A1 | 6/2017 | Feng et al. | |
| 2017/0180273 A1 | 6/2017 | Daly et al. | |
| 2017/0195253 A1 | 7/2017 | Annaluru et al. | |
| 2017/0195292 A1* | 7/2017 | Pham | H04L 63/0263 |
| 2017/0222926 A1 | 8/2017 | Mack-Crane et al. | |
| 2017/0289034 A1 | 10/2017 | Bosshart et al. | |
| 2017/0295074 A1* | 10/2017 | Chandran | H04L 43/026 |
| 2018/0041615 A1 | 2/2018 | Bosshart et al. | |
| 2018/0367338 A1 | 12/2018 | Seshadri | |
| 2019/0116132 A1* | 4/2019 | Suzuki | H04L 45/74 |

OTHER PUBLICATIONS

Non-Published commonly Owned U.S. Appl. No. 15/161,263, filed May 22, 2016, 41 pages, Barefoot Networks, Inc.

Non-Published commonly Owned U.S. Appl. No. 15/836,528, filed Dec. 8, 2017, 30 pages, Barefoot Networks, Inc.

\* cited by examiner

STORING PACKET DATA IN MIRROR BUFFER

CLAIM OF BENEFIT TO PRIOR APPLICATIONS

This application is a continuation of U.S. patent application Ser. No. 15/161,263, filed May 22, 2016. U.S. patent application Ser. No. 15/161,263 claims priority from U.S. Provisional Application 62/310,608, filed Mar. 18, 2016. U.S. application Ser. No. 15/161,263 is incorporated herein by reference.

BACKGROUND

In Software Defined Networking (SDN), the control plane is physically separated from the forwarding plane and communicates with the forwarding plane through an interface (e.g., the OpenFlow protocol). OpenFlow is an evolving networking standard that uses a match-action paradigm for network packet switching. The typical hardware switches that were (and still are) used to implement the match-action paradigm, however, are not quite flexible as they process only a fixed set of fields with a limited repertoire of packet processing actions. A reconfigurable match table (RMT) architecture that overcomes the aforementioned shortcomings has recently been introduced to the market. This new architecture could be improved to make the hardware switch operate more efficiently.

SUMMARY

Some embodiments provide a forwarding element (e.g., a hardware switch) with temporary storages to which the forwarding element copies certain types of packets, in order for the packet copies to later be re-inserted into the forwarding element pipeline. In some embodiments, the temporary storages (or at least some of the temporary storages) only store certain portions of the packet copies, rather than a copy of the entire packet. For instance, a first temporary storage might store bits corresponding to a first set of headers for packets copied to the first temporary storage, while a second temporary storage stores bits corresponding to the first set of headers and a second set of headers for packets copied to the second temporary storage.

The temporary storages, in some embodiments, are storages (e.g., buffers) outside of the standard packet processing pipeline of the forwarding element. In some embodiments, packets received by the forwarding element typically are sent through an ingress pipeline and an egress pipeline, with a queue for redistributing traffic located between the two pipelines. Each of the ingress and egress pipelines includes a parser, a match-action unit (MAU), and a deparser. The parser for each pipeline parses the packet into its constituent header fields for processing by the MAU, so that the MAU can easily isolate specific header fields. The MAU matches these header fields (and potentially other packet data) against its match entries over multiple stages, with each match entry having a corresponding set of actions (e.g., stored in action entries to which the match entries refer). When a packet matches a specific match entry at a stage of the MAU, the MAU performs the corresponding set of actions on the packet before its processing at the next MAU stage. The deparser then reassembles the packet header fields (which may have been modified by the MAU) into a complete packet.

The packet copies stored in the temporary storage are copies of packets that go through complete processing in the forwarding element pipeline. In some embodiments, the forwarding element sends a copy of a packet to the temporary storage based on a matched entry in the MAU (of either the ingress or egress pipeline) having a corresponding action entry that specifies (among its set of actions) to copy the packet (or a specific portion of the packet) to the particular temporary storage. For instance, the action might specify to copy the first X bits of the packet headers to the temporary storage having identifier Y, with each temporary storage having a different identifier. In other embodiments, the action specifies simply to copy the packet to temporary storage Y, with the temporary storage itself discriminating as to how many bits it stores of the packet.

As mentioned, when a packet is copied to a temporary storage, the forwarding element does not stop processing the packet (unless the action entry also specifies to drop the packet), but instead completes its processing of the packet. At some later time, the stored packet data is released from the temporary storage and re-inserted into the forwarding element pipeline. Some embodiments insert this packet data at the ingress pipeline deparser as, effectively, a new packet. At this point, the packet will be reconstructed (possibly with additional information from the temporary storage, as noted below), and sent to the traffic redistribution buffer and then egress pipeline. In some embodiments, due to the additional information appended to the packet header data, the egress pipeline sends the copied packet data to a different destination than its corresponding original packet. For instance, some embodiments use the temporary storages as a mechanism to enable traffic monitoring, with the packet copies sent through a network to a traffic monitor.

In some embodiments, these monitoring devices monitor for the presence and/or amount of certain types of packets in the network, how certain types of packets are being processed by the forwarding elements in the network, etc. Thus, the temporary storages are used as a mechanism to forward copies of specific types of packets to the monitoring devices. In addition to the copies of the packets, the monitoring devices in some embodiments are be able to recognize additional data (i.e., metadata) about the packets received from the forwarding element.

Thus, when storing the packet copies, some embodiments insert the metadata into the temporary storage along with the copied packet data (irrespective of whether the stored packet data is the entire packet or only a portion of the packet). This data may include information about the processing of the packet through the forwarding element pipeline prior to the packet being copied to the temporary storage. For instance, the metadata stored with each packet copy might include a timestamp indicating the time that the packet was received (or the time the packet was copied to the storage), the queue conditions in the forwarding element pipeline, latency data about the packet in the forwarding element pipeline, etc. The metadata can be sent with the packet data when the packet is reinserted into the processing pipeline.

Whether storing the copy of the entire packet or merely a portion of the packet data, in some embodiments the forwarding element outputs the contents of a temporary storage periodically as a single packet, by appending all of the stored packet data (typically including data from multiple packets) together. This single coalesced packet can then be processed once by the egress pipeline and sent to the appropriate monitoring device(s). The metadata stored with each packet copy is formatted in a consistent manner readable by the monitoring device, and contained within the single packet (e.g., next to the packet data to which it refers). Different embodiments may clear out the temporary storage in response to different types of events. For instance, some embodiments use a timer that generates the single packet on a regular timed basis even when the temporary storage is not completely filled. Other embodiments wait until the temporary storage has completely filled up, or until a different percentage of the temporary storage is holding packet data. Some embodiments use a combination of the two, generating the coalesced packet after a particular time if the size limit has not yet been reached.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
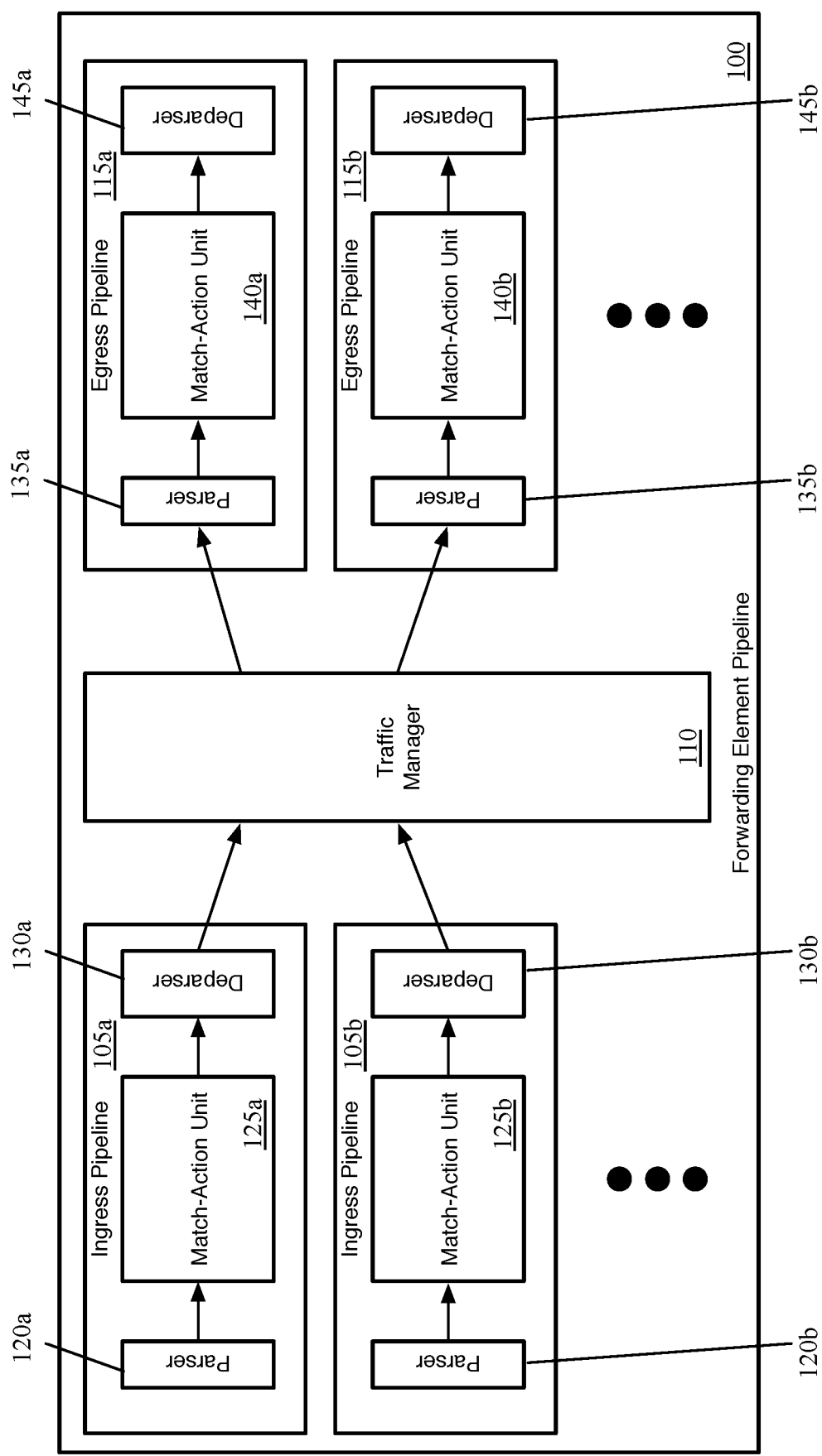
FIG. 1 illustrates the structure of a forwarding element pipeline of some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a forwarding element (e.g., a hardware switch or chip for a hardware switch) with temporary storages to which the forwarding element copies certain types of packets, in order for the packet copies to later be re-inserted into the forwarding element pipeline. In some embodiments, the temporary storages (or at least some of the temporary storages) only store certain portions of the packet copies, rather than a copy of the entire packet. For instance, a first temporary storage might store bits corresponding to a first set of headers for packets copied to the first temporary storage, while a second temporary storage stores bits corresponding to the first set of headers and a second set of headers for packets copied to the second temporary storage.

The temporary storages (also referred to as mirror buffers, as they mirror packet data), in some embodiments, are storages (e.g., buffers) outside of the standard packet processing pipeline of the forwarding element. In some embodiments, packets received by the forwarding element typically are sent through an ingress pipeline and an egress pipeline, with a queue for redistributing traffic located between the two pipelines. Each of the ingress and egress pipelines includes a parser, a match-action unit (MAU), and a deparser. The parser for each pipeline parses the packet into its constituent header fields for processing by the MAU, so that the MAU can easily isolate specific header fields. The MAU matches these header fields (and potentially other packet data) against its match entries over multiple stages, with each match entry having a corresponding set of actions (e.g., stored in action entries to which the match entries refer). When a packet matches a specific match entry at a stage of the MAU, the MAU performs the corresponding set of actions on the packet before its processing at the next MAU stage. The deparser then reassembles the packet header fields (which may have been modified by the MAU) into a complete packet.

The packet copies stored in the mirror buffer are copies of packets that go through complete processing in the forwarding element pipeline. In some embodiments, the forwarding element sends a copy of a packet to the mirror buffer based on a matched entry in the MAU (of either the ingress or egress pipeline) having a corresponding action entry that specifies (among its set of actions) to copy the packet (or a specific portion of the packet) to the particular mirror buffer. For instance, the action might specify to copy the first X bits of the packet headers to the mirror buffer having identifier Y, with each mirror buffer having a different identifier. In other embodiments, the action specifies simply to copy the packet to mirror buffer Y, with the mirror buffer itself discriminating as to how many bits it stores of the packet.

As mentioned, when a packet is copied to a mirror buffer, the forwarding element does not stop processing the packet (unless the action entry also specifies to drop the packet), but instead completes its processing of the packet. At some later time, the stored packet data is released from the mirror buffer and re-inserted into the forwarding element pipeline. Some embodiments insert this packet data at the ingress pipeline deparser as, effectively, a new packet. At this point, the packet will be reconstructed (possibly with additional information from the mirror buffer, as noted below), and sent to the traffic redistribution queue and then egress pipeline. In some embodiments, due to the additional information appended to the packet header data, the egress pipeline sends the copied packet data to a different destination than its corresponding original packet. For instance, some embodiments use the mirror buffers as a mechanism to enable traffic monitoring, with the packet copies sent through a network to a traffic monitor.

In some embodiments, these monitoring devices monitor for the presence and/or amount of certain types of packets in the network, how certain types of packets are being processed by the forwarding elements in the network, etc. Thus, the mirror buffers are used as a mechanism to forward copies of specific types of packets to the monitoring devices without interrupting the flow of the packets themselves. In addition to the copies of the packets, the monitoring devices in some embodiments are able to recognize additional data about the packets (i.e., packet metadata) received from the forwarding element.

Thus, when storing the packet copies, some embodiments insert metadata into the mirror buffer along with the copied packet data (irrespective of whether the stored packet data is the entire packet or only a portion of the packet). This metadata may include information about the processing of the packet through the forwarding element pipeline prior to the packet being copied to the mirror buffer. For instance, the metadata stored with each packet copy might include a timestamp indicating the time that the packet was received at the mirror buffer (or copied to the mirror buffer), the queue conditions in the forwarding element pipeline, latency data about the packet in the forwarding element pipeline, etc. The metadata can then be sent along with the packet data when the packet is reinserted into the processing pipeline.

Whether storing the copy of the entire packet or merely a portion of the packet data, in some embodiments the forwarding element outputs the contents of a mirror buffer periodically as a single packet, by appending all of the stored packet data (typically including data from multiple packets) together. This single coalesced packet can then be processed once by the egress pipeline and sent to the appropriate monitoring device(s). The metadata stored with each packet copy is formatted in a consistent manner readable by the monitoring device, and contained within the single packet (e.g., next to the packet data to which it refers). Different embodiments may clear out the mirror buffer in response to different types of events. For instance, some embodiments use a timer that generates the single packet even when the temporary storage is not completely filled. Other embodiments wait until the mirror buffer has completely filled up, or until a different percentage of the mirror buffer is holding packet data. Some embodiments use a combination of the two, generating the coalesced packet after a particular time if the size limit has not yet been reached.

The above introduces the mirror buffers storing only a portion of copied packet data as well as the outputting of the entire mirror buffer contents as a single packet according to some embodiments of the invention. In the following, Section I describes the structure of the hardware forwarding element of some embodiments that includes mirror buffers. Section II then describes the storing of packet data in mirror buffers according to some embodiments, while Section III describes the output of that packet data from the mirror buffers and its re-insertion into the forwarding element processing pipeline. Finally, Section IV describes the electronic system with which some embodiments of the invention are implemented.

I. Forwarding Element Structure

As mentioned, in some embodiments, the packet processing pipeline of the forwarding element in some embodiments includes an ingress pipeline, egress pipeline, and traffic management queue. Specifically, some embodiments include multiple ingress pipelines and multiple egress pipelines to which packets can be assigned, with a traffic management queue in between the ingress and egress pipelines.

FIG. 1 illustrates the structure of such a forwarding element pipeline 100 of some embodiments. Specifically, FIG. 1 illustrates several ingress pipelines 105, a traffic manager 110, and several egress pipelines 115. When the forwarding element 100 receives a packet, in some embodiments the packet is directed to one of the ingress pipelines 105. After passing through the selected ingress pipeline 105, the packet is sent to the traffic manager 110, where the packet enters a queue. The traffic manager 110 then dispatches the packet to one of the egress pipelines 115. In some embodiments, the there is no necessary correlation between which of the ingress pipelines 105 processes a packet and to which of the egress pipelines 115 the traffic manager 110 dispatches the packet. That is, a packet might be initially processed by ingress pipeline 105b, and then subsequently by egress pipeline 115a, or vice versa. In subsequent figures, only one ingress pipeline and one egress pipeline will be shown for simplicity.

Each ingress pipeline 105 includes a parser 120, a match-action unit (MAU) 125, and a deparser 130. Similarly, each egress pipeline 115 includes a parser 135, a MAU 140, and a deparser 145. The parser 120 or 135, in some embodiments, receives a packet as a formatted collection of bits in a particular order, and parses the packet into its constituent header fields according to a parse graph state machine. That is, the parser starts from the beginning of the packet and parses each header field in order, assigning these header fields to fields of a packet header vector for processing. Based on the values of certain fields (e.g., the Ethertype field of an Ethernet header, the Protocol field of an Internet Protocol header, etc.), the parser can determine the structure of the next set of header fields. In some embodiments, the parser 120 or 135 separates out the packet headers (up to a designated point) from the payload of the packet, and sends the payload directly to the deparser without going through the MAU processing (e.g., on a single wire).

The MAU 125 or 140 performs processing on the packet data (i.e., the packet header vector). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU.

The deparser 130 or 145 reconstructs the packet using the packet header fields as modified by the MAU 125 or 140 and the payload received directly from the parser 120 or 135. The deparser constructs a packet that can be sent out onto the wire.

Figure 2:
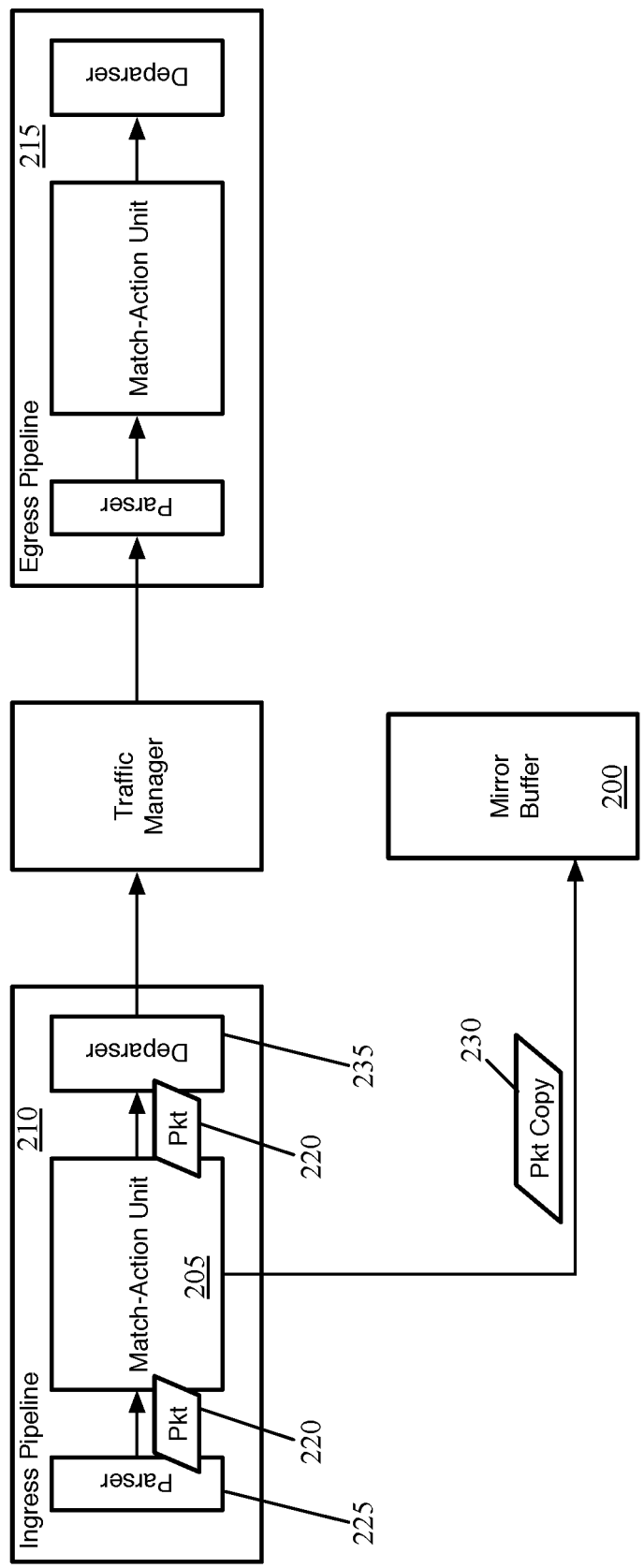
FIG. 2 illustrates the MAU of an ingress pipeline directing a copy of packet data to a mirror buffer.
Figure 3:
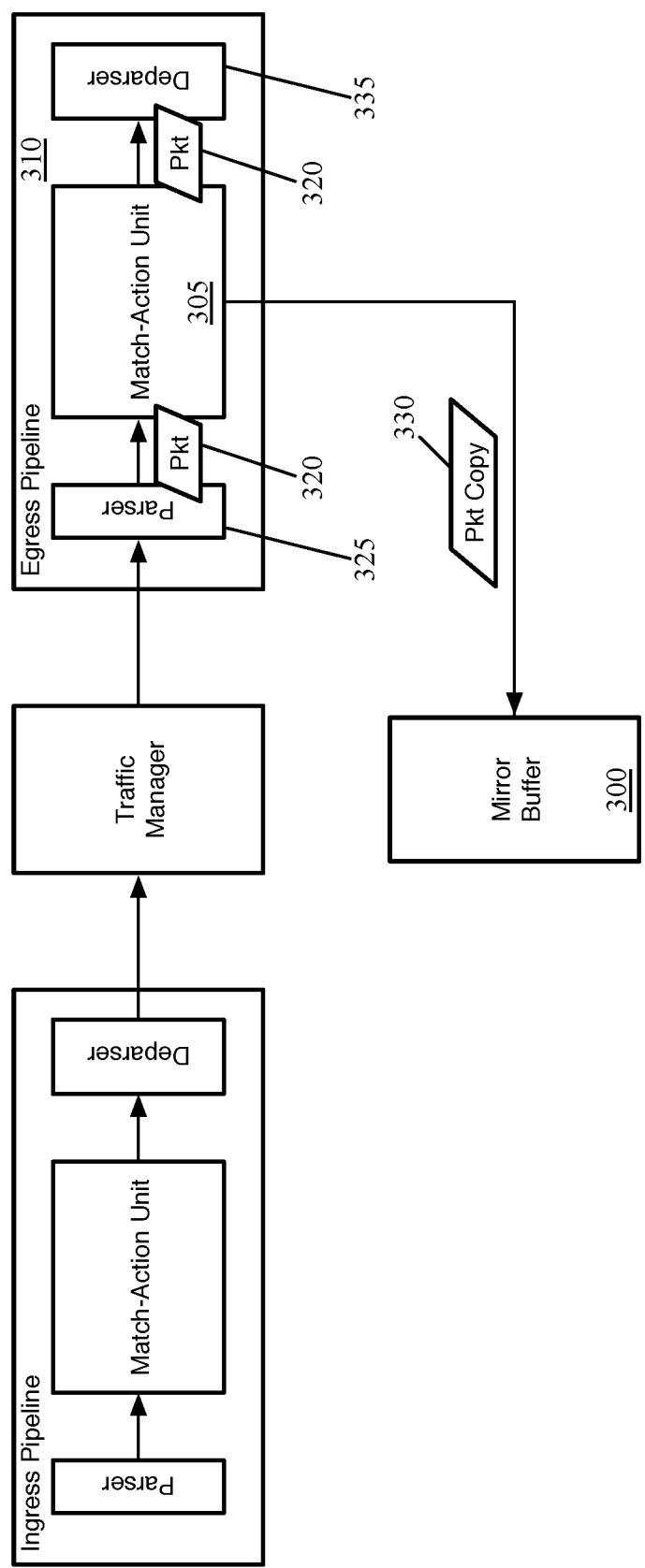
FIG. 3 illustrates the MAU of an egress pipeline directing a copy of packet data to a mirror buffer.
Figure 4:
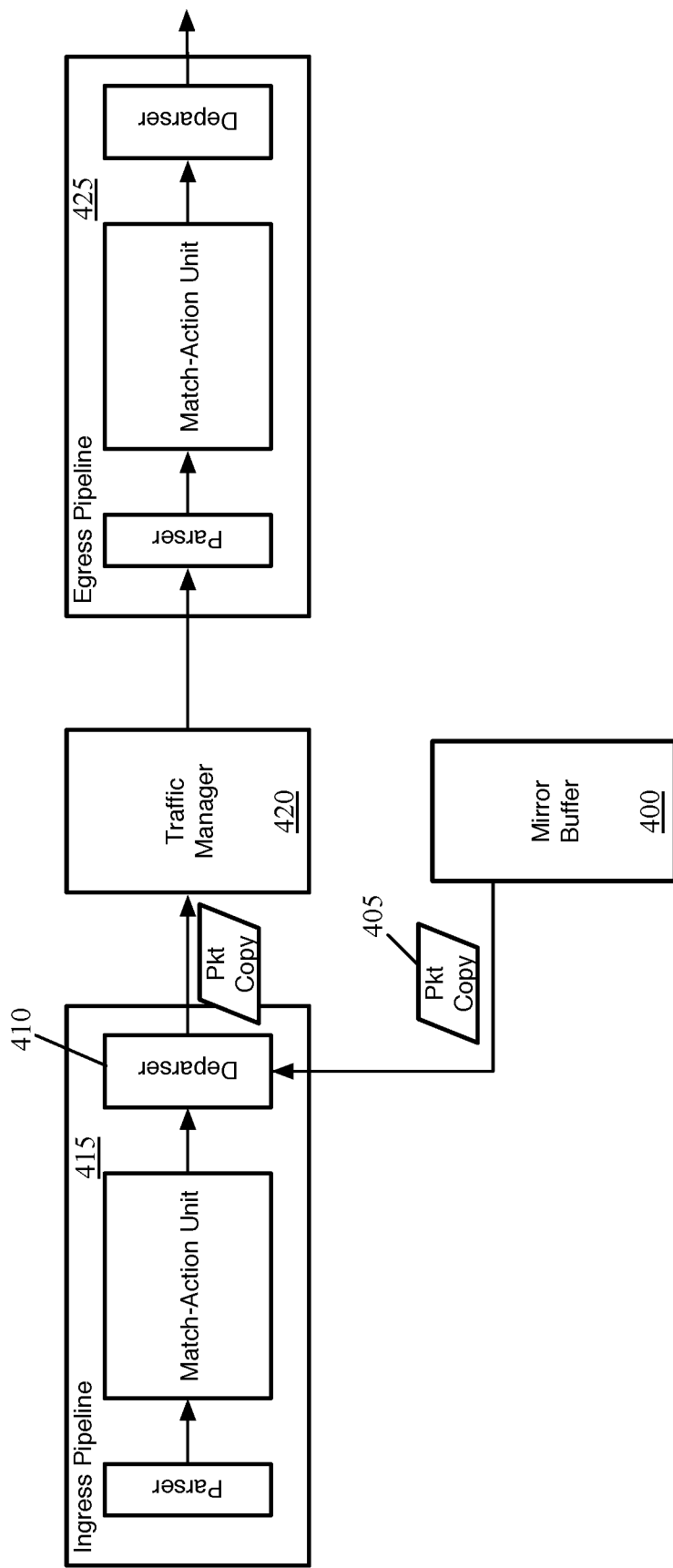
FIG. 4 illustrates an example of a mirror buffer re-inserting a packet into the processing pipeline.

In general, a typical packet will be processed by one of the ingress pipelines 105, the traffic manager 110, and one of the egress pipelines 115. In addition, the forwarding element may contain other features not shown in FIG. 1. As an example, some embodiments include one or more temporary storages, also referred to as mirror buffers, used to store copies of packets or portions of packets without affecting the processing of the original packet. FIGS. 2-4 illustrate the way in which mirror buffers of some embodiments may be used.

FIGS. 2 and 3 illustrate the MAUs of the forwarding element processing pipeline sending packet copies to a mirror buffer. Specifically, FIG. 2 illustrates the MAU 205 of an ingress pipeline 210 directing a copy 230 of packet data to a mirror buffer 200. As shown, the ingress pipeline 210 and an egress pipeline 215 are structured as shown in FIG. 1. In this case, a packet 220 enters the ingress pipeline 210 and is sent from the ingress parser 225 to the MAU 205 (more accurately, the packet header fields of the packet 220 are sent to the MAU, while the payload bypasses the MAU).

The MAU 205 processes the packet through its match-action stages, potentially modifying various packet headers. At one of these stages, the action entry corresponding to a matched match entry specifies to copy the packet to the mirror buffer 200. Thus, the figure shows that in addition to the packet 220 being sent to the deparser 235 (after processing is completed in the MAU), a copy 230 of the packet is also sent to the mirror buffer 200. In some embodiments, the mirror buffer 200 is one of several (e.g., 8, 64, 1024, etc.) mirror buffers available on the forwarding element. These mirror buffers are temporary storage (e.g., SRAMs) that are controlled by logic (e.g., a controller) which defines how data is stored (e.g., how much data of a packet sent to the mirror buffer is stored in a slot) and how data is released (e.g., when a packet copy is re-inserted into the processing pipeline). As described below, different mirror buffers may have different properties—for instance, they may store different portions of the packet headers, or store different types of additional descriptive metadata for each packet.

When a match-action stage specifies to copy a packet to a mirror buffer, some embodiments copy the packet bits and send those bits through a connecting wire to the correct mirror buffer. Each mirror buffer has an identifier in some embodiments, such that specific packets can be sent to specific different buffers. The MAU, in some embodiments, may also send certain additional metadata with the packet header copy, such as a timestamp (e.g., the time the packet entered the MAU, the time the packet was sent to the mirror buffer, etc.), queue conditions when the packet was processed (e.g., conditions in the traffic manager), latency information, or other data. In some embodiments, the match-action stages include meter and statistics memories from which metadata can be read into the mirror buffer along with a packet.

While this example shows the ingress pipeline sending a copy of packet data to a mirror buffer, the MAU in the egress pipeline may also send data to mirror buffers. FIG. 3 illustrates the MAU 305 of an egress pipeline 310 directing a copy 330 of packet data to a mirror buffer 300. As shown, a packet 320 enters the egress pipeline 310 and is sent from the egress parser 325 to the MAU 305 (more accurately, the packet header fields of the packet 320 are sent to the MAU, while the payload bypasses the MAU). At one of its match-action stages, the MAU 305 determines to copy the packet to the mirror buffer 300, and thus the MAU sends both the packet copy 330 to the mirror buffer 300 as well as the packet data 320 in the pipeline to the deparser 335. In both cases, it should be noted that the copy of packet data sent to the mirror buffer is a copy of the data as it was at the time the action entry specified for the packet to be copied, and that some of the packet header fields might be modified by the time the MAU has completed processing the packet.

The mirror buffers, in some embodiments, are used to temporarily store packet data so that data can then be re-inserted into the pipeline and sent to a different destination than the original packet. As mentioned, the stored packet data is released from the mirror buffer (e.g., after a particular amount of time) and re-inserted into the forwarding element pipeline. Some embodiments insert this packet data at the ingress pipeline deparser as, effectively, a new packet. At this point, the packet is reconstructed and sent to the traffic manager (and then egress pipeline). In some cases, due to additional metadata appended by the mirror buffer, the egress pipeline outputs the re-inserted packet to a different destination than its original corresponding packet. For instance, some embodiments use the mirror buffers as a mechanism to enable traffic monitoring, with the packet copies sent through a network to a traffic monitor.

FIG. 4 illustrates an example of a mirror buffer 400 re-inserting a packet into the processing pipeline. Based on a predefined occurrence, the mirror buffer 400 releases one of its copies of packet data 405 and sends this packet copy to the deparser 410 of the ingress pipeline 415, which reconstructs the packet (including any additional data added at the mirror buffer 400). The packet copy 405 is sent to the traffic manager 420, then through the egress pipeline 425 an output from the forwarding element. The mirror buffer 400 may release packet data for various reasons in different embodiments. For instance, some embodiments release packet data a particular amount of time after receiving the packet data, while other embodiments release the earliest-received packet data when the mirror buffer is filled up or hits a particular percentage of being filled.

II. Storing Packet Data in Mirror Buffer

In some embodiments, when a packet is copied to the mirror buffer, the buffer does not store the entire packet. Instead, some embodiments only store certain portions of the packet copies. Specifically, some embodiments only store the first X bits of the packet (as the packet would be constructed for transmission through a network), with X being a different number of bits for different mirror buffers. As an example, the bits stored in a first mirror buffer might correspond to a first set of header fields, while the bits stored in a second mirror buffer correspond to the first set of header fields and a third set of header fields, and the bits stored in a third mirror buffer correspond to a completely different fourth set of header fields. By using the MAU to only copy packets meeting certain characteristics to each mirror buffer, the forwarding element can ensure that any particular mirror buffer will store copies of packets with the same structure, and therefore the same header fields (though not necessarily the same header field values).

Figure 5:
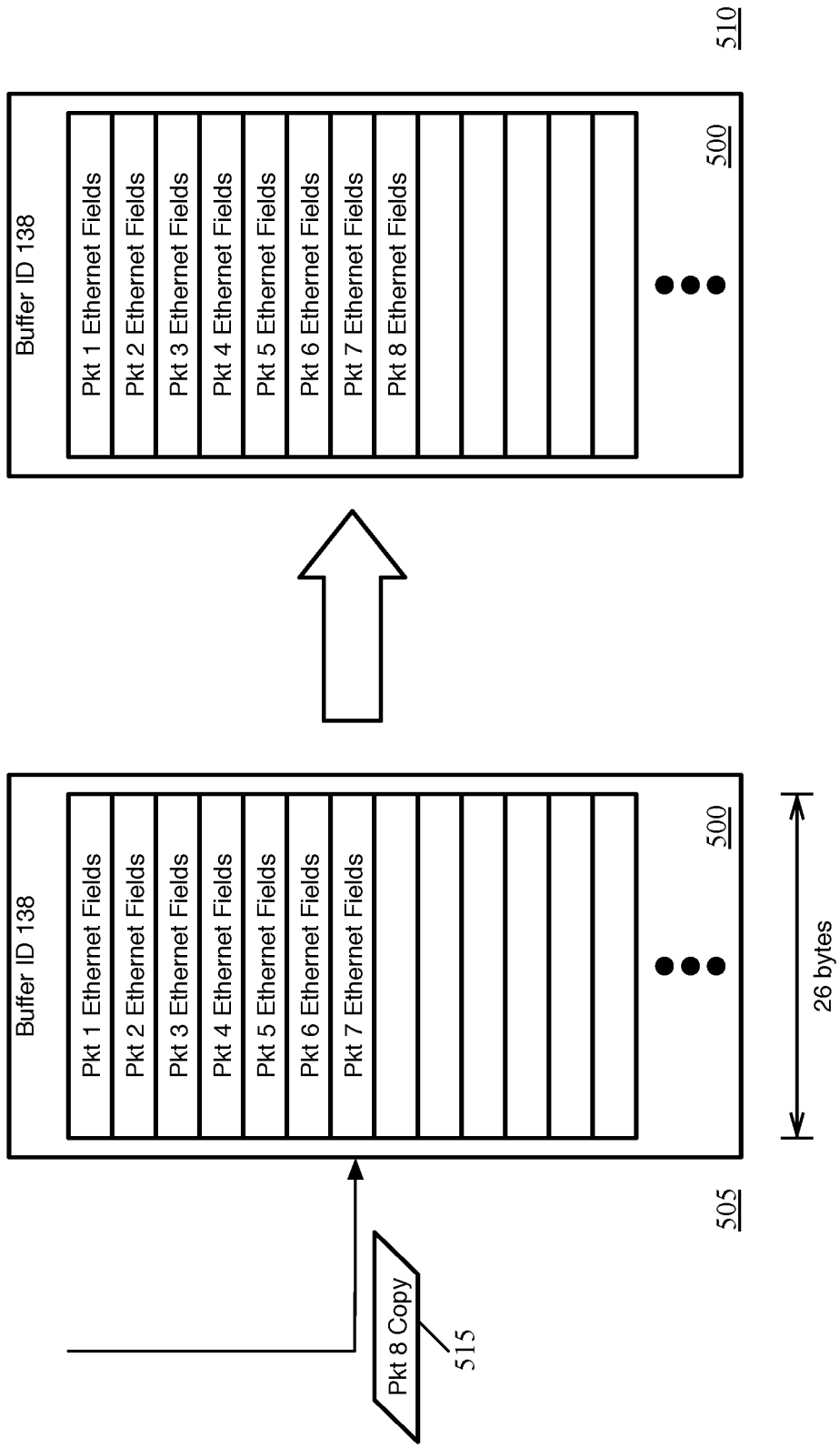
FIG. 5 conceptually illustrates a mirror buffer receiving a packet copy and adding a portion of the copied packet data to its stored data.

FIG. 5 conceptually illustrates a mirror buffer 500 receiving a packet copy 515 and adding a portion of the copied packet data to its stored data, over two stages 505-510. As shown in the first stage 505, the mirror buffer 500 stores packet data in its several slots. In some embodiments, each mirror buffer is a unit memory (e.g., a SRAM), and each slot corresponds to one location (e.g., RAM word) of that memory. In some cases, each word may be divided further to hold data from multiple packets, if the amount of data stored from each packet is small enough. For instance, a memory buffer that is 128 bits wide might hold two 64-bit packet data portions per word in some embodiments.

In this example, the mirror buffer 500 has an identifier (138) that identifies it among numerous such mirror buffers available to the MAU. This identifier is used, e.g., by the action entries in the MAU to specify the location to which the action engine will copy packet data. In some embodiments, an action entry specifies not just that the packet is to be copied to a mirror buffer, but to a specific mirror buffer identified by its buffer identifier.

In addition, the mirror buffer 500 currently stores copied data for seven packets that have met the criteria for being copied to this particular mirror buffer. Specifically, in this case, the mirror buffer 500 stores only the first 26 bytes of data of these packets, corresponding to the Ethernet header of an Ethernet frame (including the preamble and start of frame delimiter, and including a 802.1Q (VLAN) tag). To isolate only a certain portion of the packets, in some embodiments the action entry that copies packet data to the particular mirror buffer specifies for only certain fields to be copied to the mirror buffer. In other embodiments, however, the MAU sends the entire set of bits to the buffer, which then includes logic to only store the first X bits of the packet data, discarding the rest. In addition, the mirror buffer keeps track of which of its words are currently occupied by packet data and which are empty, so that as a packets are sent to the buffer it can store the packets in the next available location.

In this example, the MAU has copied packet data 515 (the entire packet data) to the mirror buffer 500, as shown in the first stage 505. In the second stage 510, the mirror buffer 500 has stored only the Ethernet fields (the first 26 bytes) of the packet data 515, and discarded the remaining data.

Figure 6:
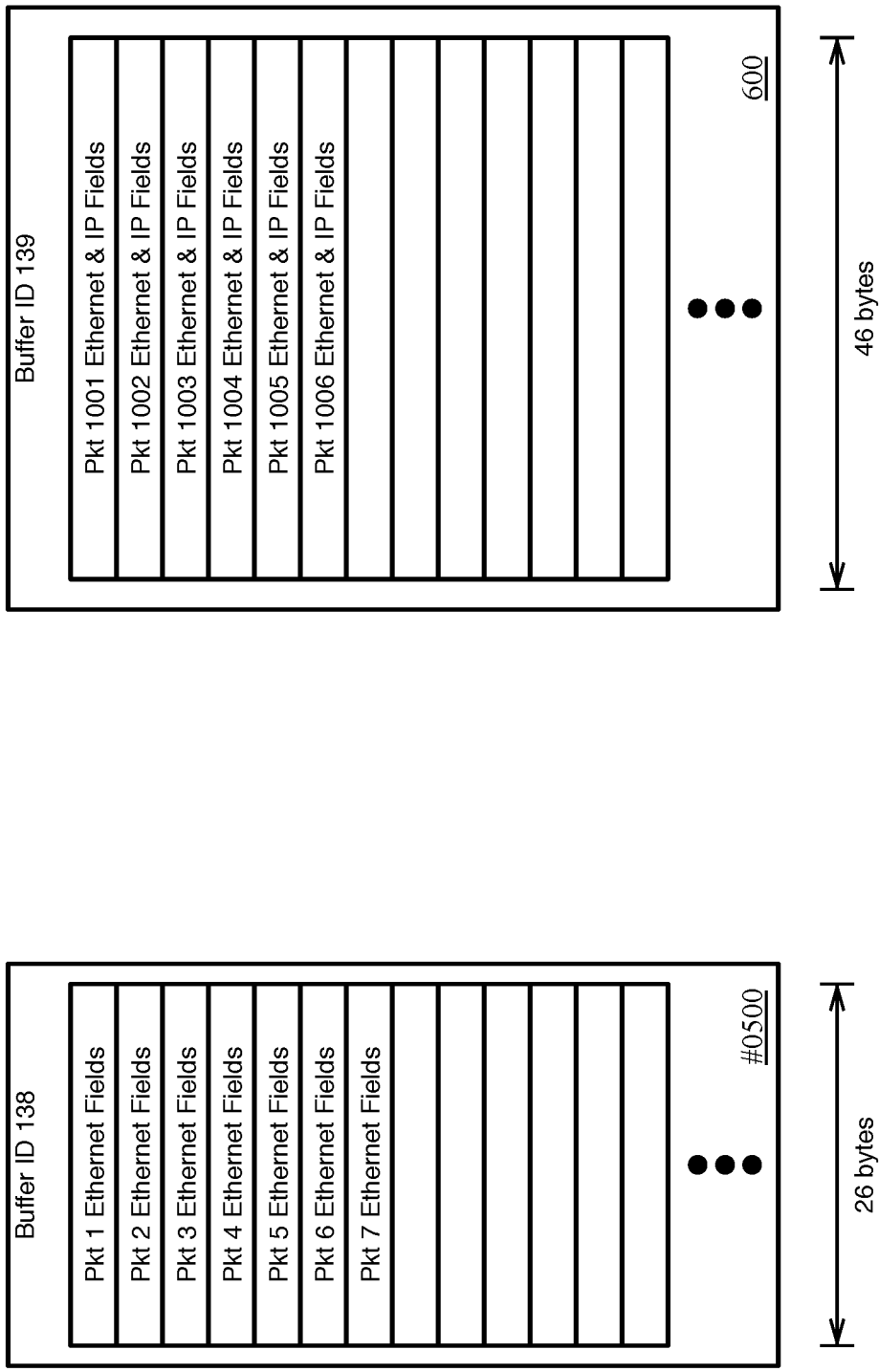
FIG. 6 conceptually illustrates both the mirror buffer from FIG. 5 as well as a second mirror buffer on the same hardware forwarding element.

FIG. 6 conceptually illustrates both the mirror buffer 500 from FIG. 5 as well as a second mirror buffer 600 on the same hardware forwarding element. These two buffers, however, store different amounts of data for each packet copied to the respective buffers. As described above, the first mirror buffer 500 stores the first 26 bytes of each packet copied to that buffer, such that only the Ethernet fields are stored. The second mirror buffer 600 (with mirror buffer identifier 139) stores the first 46 bytes of each packet, which is enough to store both the Ethernet and IP header fields (with the IP header occupying 20 bytes). Even if all of the mirror buffers are the same size of unit memory, some embodiments configure the buffers to store different amounts of data per packet by logic that only accepts the first X number of bits of the packet and discards the rest. Other embodiments, however, configure the action entry at the MAU to only specify to send certain packet data to the mirror buffer, which then stores all of the data that it receives.

In addition to storing the copied packet data, some embodiments store additional metadata about the packet in the mirror buffer. This metadata may be inserted irrespective of whether the entire packet or only a portion of the packet is stored in the mirror buffer. The metadata may include information about the processing of the packet through the forwarding element pipeline prior to the packet being copied to the mirror buffer. For instance, the additional metadata stored with each packet copy might include a timestamp indicating the time that the packet was received at the MAU or mirror buffer (or the time copied to the mirror buffer), the queue conditions in the forwarding element pipeline, latency data about the packet in the forwarding element pipeline, etc. The metadata can then be sent with the packet data when the packet is reinserted into the processing pipeline.

In some embodiments, this additional metadata is generated and sent by the MAU. For instance, the MAU of some embodiments sends the metadata and the packet data together (e.g., on the same wire, with the metadata in front of the packet data). The MAU identifies the appropriate metadata data for the specific mirror buffer, generates this metadata, and sends it with the packet data. The mirror buffer logic then accounts for this when capturing the appropriate portion of the copied packet data. It should be noted that, in some embodiments, the actual copying of the packet data (including metadata) to the mirror buffer is performed by the deparser of either the ingress pipeline or egress pipeline according to instructions from the MAU. In addition, sideband data may also be sent to the mirror buffer by the MAU in some embodiments, specifying, e.g., the number of bytes of packet data to store.

Figure 7:
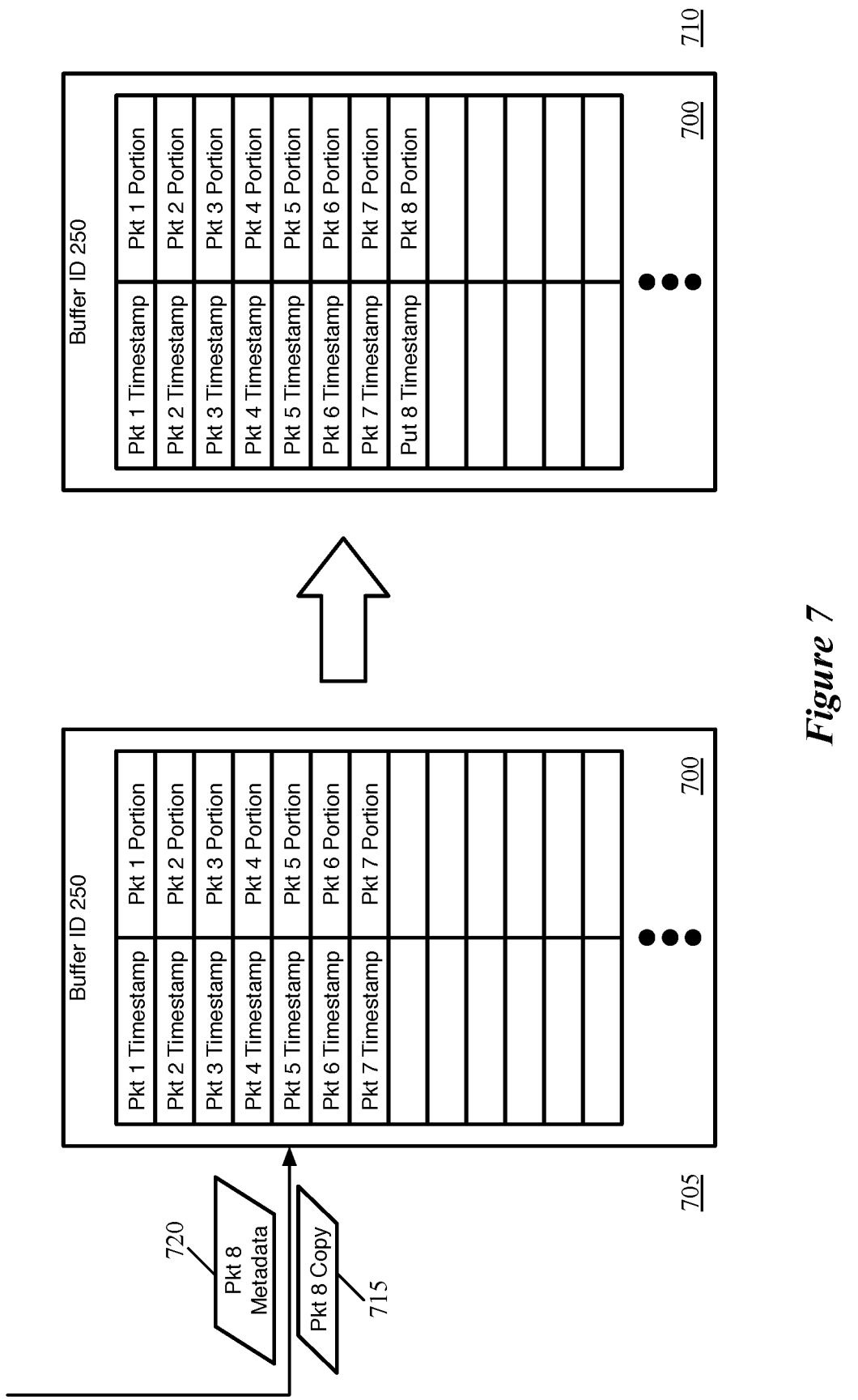
FIG. 7 conceptually illustrates a mirror buffer receiving a packet copy along with metadata, and adding both a portion of the copied packet data and the metadata to its stored data.

FIG. 7 conceptually illustrates a mirror buffer 700 receiving a packet copy 715 along with additional metadata 720, and adding both a portion of the copied packet data and the additional data to its stored data, over two stages 705-710. As shown in the first stage 705, the mirror buffer 700 stores both a timestamp as well as a packet data portion in each of its several slots (e.g., each word). In this example, the only metadata stored is a timestamp, but some embodiments may store other metadata about the packet processing, such as meter or statistics information from the match stage that copies the packet to the mirror buffer, latency information about the packet, queue time (e.g., time that the packet spent in the traffic manager queue between the ingress and egress pipelines, time that the packet was enqueued prior to entering the egress pipeline, etc.). This packet processing metadata may be analyzed when the packet is released by the mirror buffer and sent through the network to a monitoring device in some embodiments.

As shown in the first stage 705, the mirror buffer 700 receives packet data 715 from the MAU, along with additional metadata about the packet. As described above for the packet data, some embodiments send the entire packet data on the wire to the mirror buffer, and the buffer's logic discriminates to only store the first X bits of the packet data. Similarly, some embodiments always send the same additional metadata from the MAU to all mirror buffers, which then use logic configured to store only a portion of the metadata. In other embodiments, the metadata sent to the mirror buffer is configured at the MAU, so that only the desired information is either sent separately (as in this example) or sent in front of the packet data on the wire. In the second stage 710, the mirror buffer logic has stored both the timestamp data 720 and a portion of the packet data 715.

Figure 8:
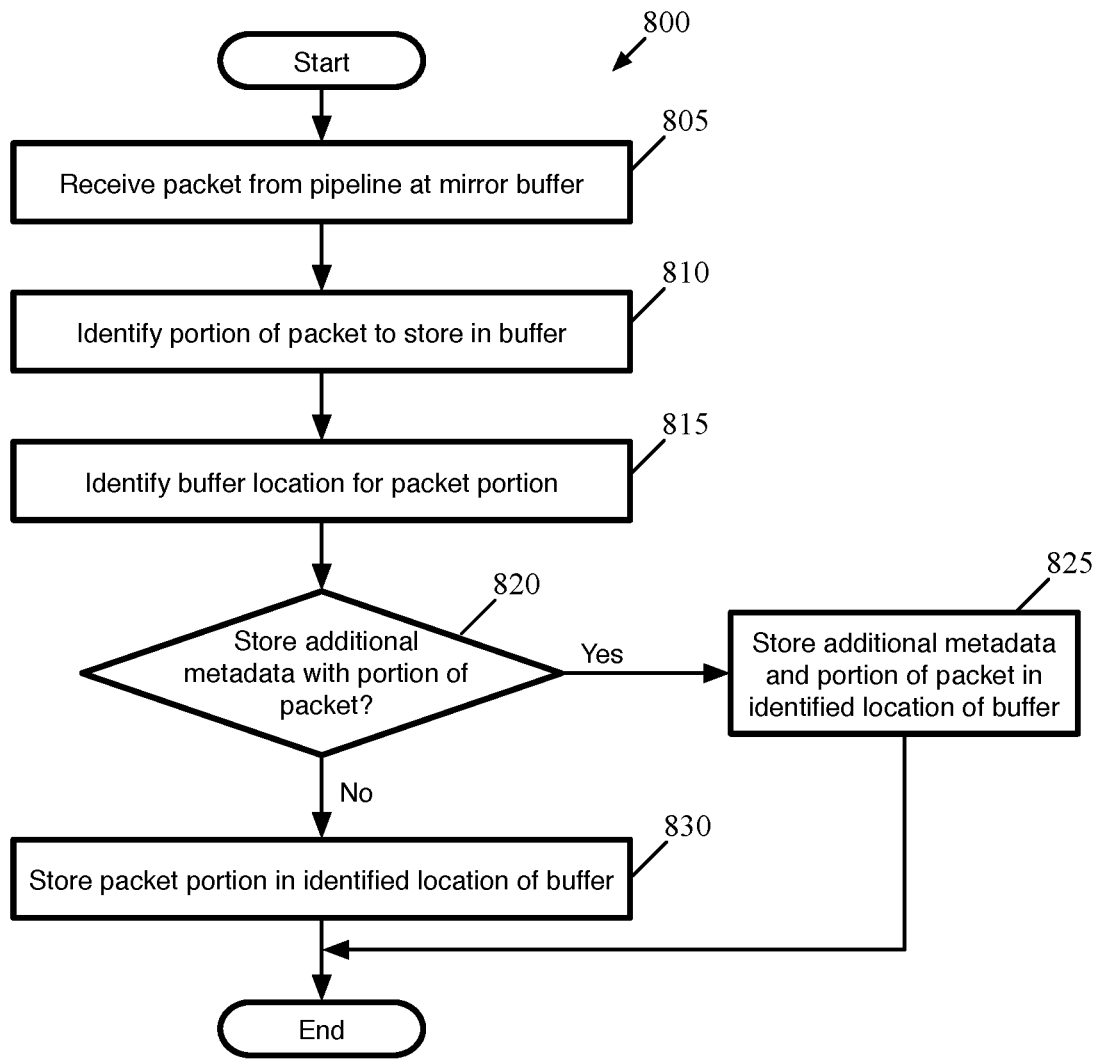
FIG. 8 conceptually illustrates a process of some embodiments for storing packet data in a mirror buffer location.

FIG. 8 conceptually illustrates a process 800 of some embodiments for storing packet data in a mirror buffer location. The process 800 is performed by a hardware forwarding element—specifically by the logic controlling a mirror buffer, in some embodiments, in response to a copy of packet data being sent to the mirror buffer. That is, the process 800 begins after the processing pipeline (e.g., an ingress or egress pipeline) of the forwarding element matches a packet to an entry in a match table that references an action entry which specifies copying the packet to the particular mirror buffer as one of its actions.

As shown, the process 800 begins by receiving (at 805) a packet from the processing pipeline at the mirror buffer. As noted in the previous paragraph, in some embodiments an action entry corresponding to a matched match entry specifies copying the packet data to the mirror buffer as one of its actions. In some embodiments, the action engine for that stage copies the packet data and transmits the packet data to the mirror buffer. The action entry, in some embodiments, specifies the particular mirror buffer using the buffer identifier, and the forwarding element logic ensures that the data is copied to the buffer that corresponds to that identifier. For instance, in some embodiments an array of mirror buffers has logic that takes the buffer identifier as input along with the copied packet data and routes the packet data to the correct buffer (e.g., correct SRAM) that corresponds to the identifier.

Next, the process 800 identifies (at 810) a portion of the packet to store in the buffer. As described in this section, some embodiments do not store a copy of the entire packet in the mirror buffer, instead only storing a limited portion corresponding to the header fields in which the eventual destination for the mirrored packets is interested. Thus, some mirror buffers might only store the Ethernet header fields (or even just a portion of the Ethernet header fields), while other mirror buffers in the same forwarding element store Ethernet and IP fields, Ethernet and ARP fields of ARP packets, Ethernet, IP, and TCP (or UDP) fields, etc. To implement this, the mirror buffers of some embodiments are configured to only store the first X number of bits of packet data that they receive for each packet, with the rest of the data discarded (with X varying between mirror buffers).

The process 800 also identifies (at 815) a location in the mirror buffer for the packet portion. As described above, in some embodiments each mirror buffer is a unit memory (e.g., an SRAM) and the copied data for each packet occupies one location in that memory (e.g., a RAM word). Thus, the mirror buffers of some embodiments store data indicating the most recently filled RAM word, so that the next location can be used for the next incoming packet. In addition, as described below, some embodiments release the packet data from the mirror buffer (e.g., a particular period of time after the packet data is received, or using another metric). After freeing up a buffer location, some embodiments leave the location empty until the last mirror buffer location has been used, and then restart at the beginning of the buffer with the data for the next copied packet.

Next, the process determines (at 820) whether to store additional metadata with the packet portion. As described above, this determination may be made in different ways in different embodiments. In some embodiments, the MAU sends the metadata to the mirror buffer based on the action entry that specifies to copy the packet data. The metadata may be sent on a separate wire from the copy of the packet data, or in front of the packet data as part of the same signal. If the metadata is sent in front of the packet data, then this is accounted for by the mirror buffer logic when capturing the appropriate portion of the copied packet data. When the additional data is sent on a separate wire, then it is easy for the mirror buffer logic to store both that metadata (or only certain metadata from the set of metadata sent by the MAU) in addition to the first X bits of the copied packet data.

This metadata may include information about the processing of the packet through the forwarding element pipeline prior to the packet being copied to the mirror buffer. For instance, the metadata stored with each packet copy might include a timestamp indicating the time that the packet was received, the queue conditions in the forwarding element pipeline, latency data about the packet in the forwarding element pipeline, etc. The metadata can then be sent with the packet data when the packet is reinserted into the processing pipeline.

When there is additional metadata to store with the packet, the process 800 stores (at 825) the metadata and the portion of copied packet data in the identified location of the mirror buffer. On the other hand, when not storing any additional metadata, the process stores (at 830) only the portion of the copied packet data in the identified location in the mirror buffer. This data (both packet data and metadata) is stored in the mirror buffer until the mirror buffer re-inserts the packet into the processing pipeline (e.g., at the deparser of the ingress pipeline) so that the packet can be delivered to a destination in the network (e.g., a monitoring device).

It should be understood that the process 800 is merely a conceptual process, and that some embodiments may not actually perform the operations in the order or manner shown in the figure. For instance, in some embodiments, the logic controlling the mirror buffer does not actually make a determination about whether to store additional packet metadata, but instead each mirror buffer is configured in such a way as to perform the correct action (i.e., to store the same data) each time packet data (and possibly additional metadata about the packet) is sent to that mirror buffer.

III. Releasing Packet Data from Mirror Buffer

Whether storing a copy of the entire packet or merely a portion of the packet data, the mirror buffers of some embodiments store the packet data so that the data can be re-inserted back into the pipeline and delivered through the network to a destination, usually different than the destination for the original packet. Some embodiments release the packet data individually (i.e., the data for each packet data is re-inserted into the processing pipeline separately).

However, in some embodiments the forwarding element outputs the contents of a mirror buffer periodically as a single packet, by appending all of the stored packet data (typically including data from multiple packets) together. This single coalesced packet can then be processed once by the egress pipeline and sent through the network to the appropriate monitoring device(s). The metadata stored with each packet copy is formatted in a consistent manner readable by the monitoring device, and contained within the single packet (e.g., next to the packet data to which it refers). The single coalesced packet may also include a header that specifies data about the coalesced packet, such as the mirror buffer identifier of the buffer at which the packet data was stored, as well as the number of packets the data of which is contained in the single packet.

Different embodiments may clear out the mirror buffer in response to different types of events. For instance, some embodiments use a timer that generates the single packet irrespective of the amount of packet data stored in the buffer. Other embodiments wait until the mirror buffer has completely filled up, or until a different percentage of the mirror buffer is holding packet data. Some embodiments use a combination of the two, generating the coalesced packet after a particular time if the size limit has not yet been reached.

Figure 9:
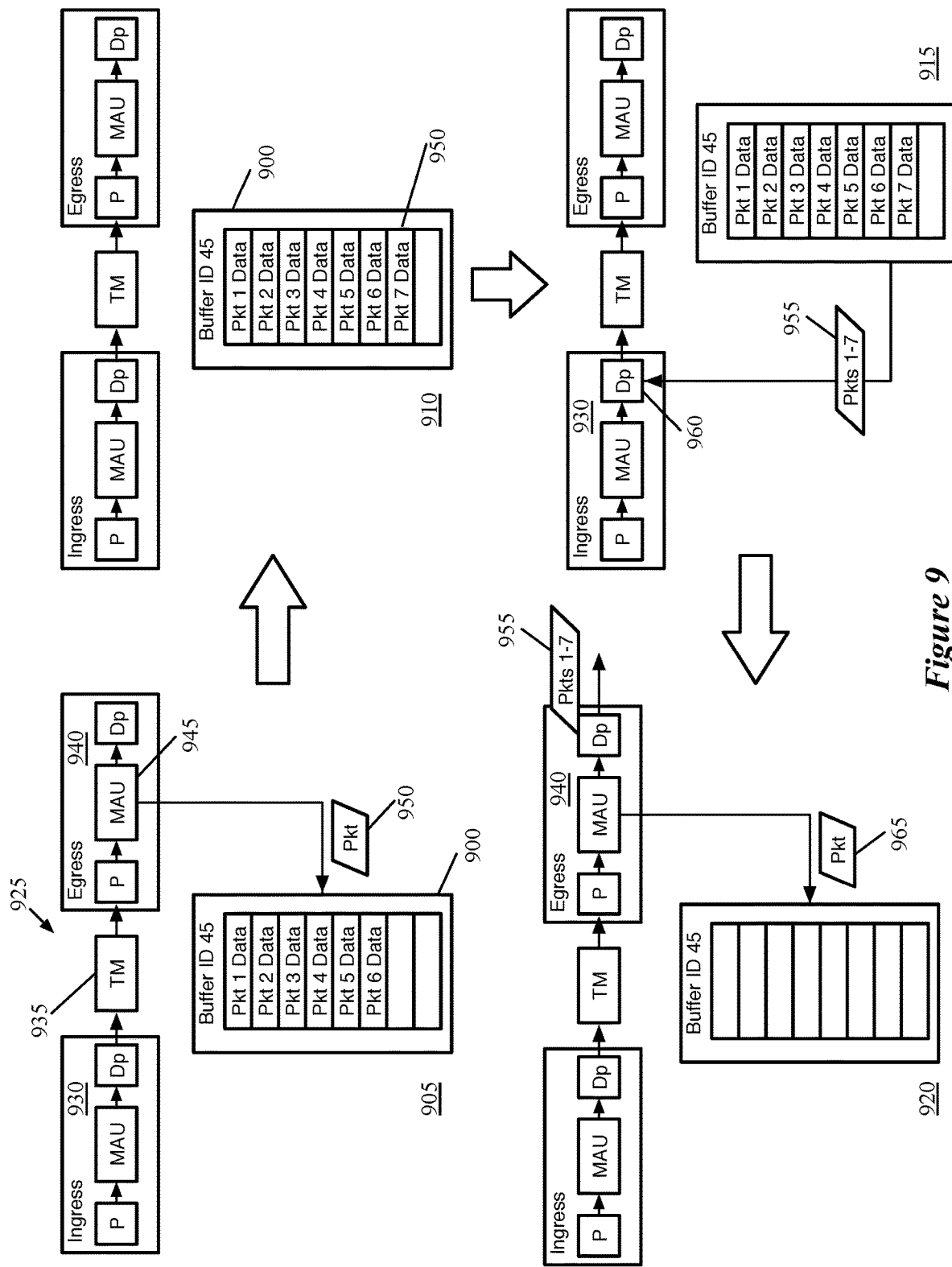
FIG. 9 conceptually illustrates an example of a processing pipeline and mirror buffer of a forwarding element as the pipeline sends a packet to the mirror buffer, which then inserts all of its stored packet data back into the pipeline to be sent out of the forwarding element.

FIG. 9 conceptually illustrates an example of a processing pipeline 925 and mirror buffer 900 of a forwarding element over four stages 905-920 as the pipeline 925 sends a packet to the mirror buffer 900, which then inserts all of its stored packet data back into the pipeline to be sent out of the forwarding element. As shown in the first stage 905, the processing pipeline 925 includes an ingress pipeline 930, a traffic manager queue 935, and an egress pipeline 940, as in the examples above. Each of the ingress and egress pipelines includes a parser, match-action unit, and deparser.

In the first stage 905, the MAU 945 of the egress pipeline 930 sends a copy of packet data 950 to the mirror buffer 900. The original packet would have matched an entry at a match stage of the MAU 945 that refers to an action entry specifying to copy the packet to mirror buffer 45, and thus the MAU 945 copies this data and sends it to the mirror buffer 900 (which has buffer identifier 45). At this stage 905, the mirror buffer 900 stores data for six packets. This may include both the packet header field data for each packet as well as additional metadata (e.g., timestamp, latency information, etc.). In the second stage 910, the mirror buffer has added the packet data 950 in its seventh packet data location.

Next, at the third stage 915, the mirror buffer 900 releases its stored packet data as a single packet 955 and inserts the single packet 955 into the forwarding element processing pipeline 925. Specifically, the mirror buffer 900 (i.e., the logic controlling the mirror buffer) sends this single packet to the deparser 960 of the ingress pipeline 930, so that the packet data can be sent to the traffic manager and then the egress pipeline. The mirror buffer 900 performs this operation to clear out its storage based on different events in different embodiments. For instance, the mirror buffers may use a timer that coalesces all of the packet data into a single packet after a particular time period (e.g., a particular number of clock cycles) has lapsed, irrespective of the number of packets stored in the mirror buffer. Mirror buffers may alternatively wait until all of their available locations are storing packet data, and generate a single packet for the entire buffer, or until a pre-configured number/percentage of the available locations are in use. Some embodiments use a combination of these triggers, with a timer-based release unless the mirror buffer fills up before the timer lapses. In some embodiments, different mirror buffers within in a single forwarding element (e.g., within a single chip) may be configured to use different triggers (e.g., different length timers) and even different types of triggers (e.g., with one mirror buffer having a timer-based trigger and a second mirror buffer having a capacity-based trigger).

Figure 10:
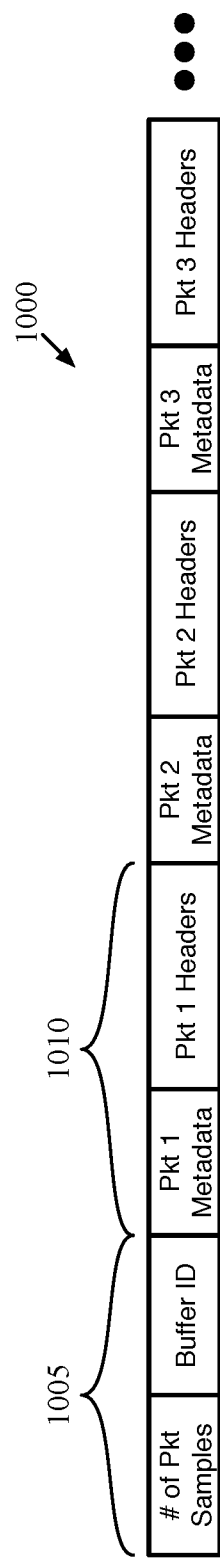
FIG. 10 conceptually illustrates an example of a packet of some embodiments that coalesces the stored data from multiple packets of a mirror buffer.

As mentioned, the packet 955 includes the data stored in the mirror buffer for all seven of the packets. Some embodiments also append an additional header to the coalesced packet 955 that is used by the egress pipeline 940 to forward the coalesced packet to its appropriate destination in the network (e.g., a monitoring device). FIG. 10 conceptually illustrates an example of such a packet 1000 that coalesces the stored data from multiple packets of a mirror buffer. As shown, the packet 1000 includes its own mirror buffer coalesced packet header 1005, which is additional data describing the packet 1000. This packet header 1005, in this example, includes the number of packet samples contained in the packet as well as the mirror buffer identifier. The header information 1005 may include other data in different embodiments, such as the amount of data contained for each packet in the single coalesced packet 1000 (e.g., the length of the sample for each packet, the time at which the single packet is released by the mirror buffer, etc. After this introductory information, some the packet 1000 includes the information for each stored packet, all appended together. For instance, the information 1010 for the first packet in the mirror buffer includes the packet processing metadata (e.g., timestamp, etc.) as well as the stored packet headers (e.g., Ethernet header fields, IP header fields, etc.). This structure is repeated for each of the packets within the mirror buffer (seven times in the example of FIG. 9).

Returning to FIG. 9, the fourth stage 920 illustrates that the egress pipeline 940 has processed the packet 955 and the packet is now being output from the forwarding element (e.g., to be sent through the network to a monitoring device). In addition, the MAU 945 of the egress pipeline 940 has sent a copy of data 965 for another packet to the mirror buffer 900. As shown, the mirror buffer 900 has been cleared of its data for the seven packets that were output at the previous stage 915. Some embodiments randomize this data or set all of the data bits to 0 when releasing the data from the buffer, while other embodiments do not modify the data in the buffer but simply treat it as no longer being there.

Figure 11:
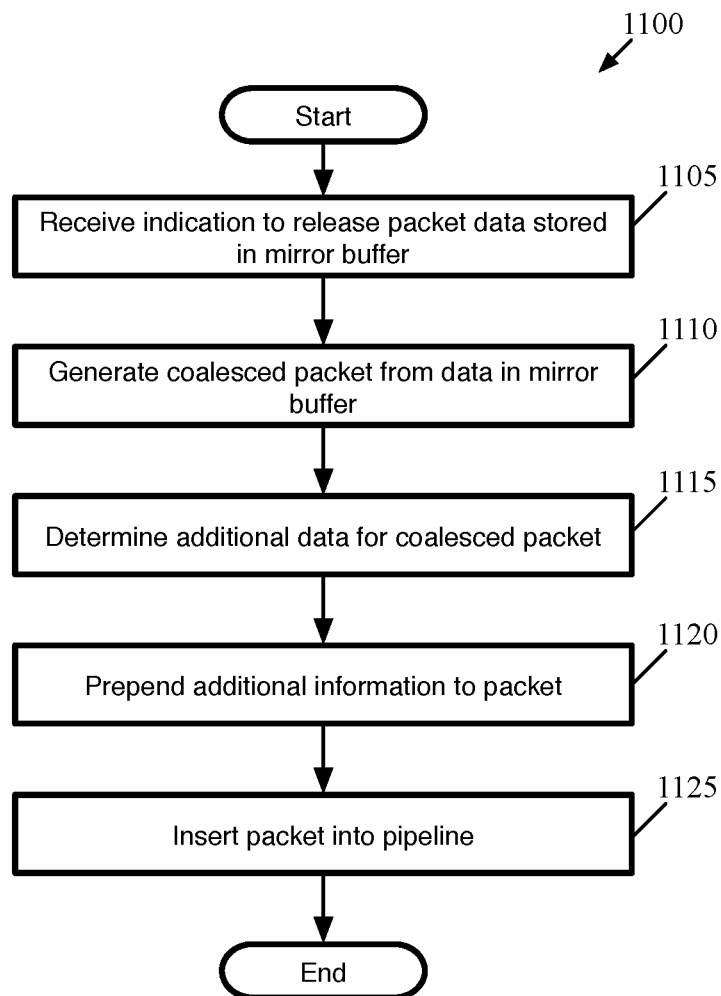
FIG. 11 conceptually illustrates a process of some embodiments performed to generate a single packet from the contents of a mirror buffer and insert that packet into a forwarding element pipeline.

FIG. 11 conceptually illustrates a process 1100 of some embodiments performed to generate a single packet from the contents of a mirror buffer and insert that packet into a forwarding element pipeline. The process 1100 is performed by a hardware forwarding element—specifically by the logic controlling a mirror buffer, in some embodiments, in response to a triggering event occurring at the mirror buffer.

As shown, the process 1100 begins by receiving (at 1105) an indication to release packet data stored in a mirror buffer. As described above, this triggering events may be different in different embodiments. For instance, some mirror buffers may use a timer that coalesces all of the packet data into a single packet after a particular time period (e.g., a particular number of clock cycles) has lapsed, irrespective of the number of packets stored in the mirror buffer. Mirror buffers may alternatively wait until all of their available locations are storing packet data, and generate a single packet for the entire buffer, or until a pre-configured number/percentage of the available locations are in use. Some embodiments use a combination of these triggers, with a timer-based release unless the mirror buffer fills up before the timer lapses. In some embodiments, different mirror buffers within a single forwarding element (e.g., in a single chip) may be configured to use different triggers (e.g., different length timers) and even different types of triggers (e.g., with one mirror buffer having a timer-based trigger and a second mirror buffer having a capacity-based trigger).

The process 1100 then generates (at 1110) a coalesced packet from the data in the mirror buffer. As shown in FIG. 10, this coalesced packet includes all of the data for each packet currently stored in the mirror buffer, including both the packet data as well as the additional processing metadata for the packet (e.g., timestamp, queue latency, etc.). Some embodiments start at the first packet in the mirror buffer and append each subsequent packet to the back of the packet. As the logic controlling the mirror buffer keeps track of how many locations in the buffer currently store packet data, the packet generation can avoid pulling data from any of the empty buffer locations.

Next, the process 1100 determines (at 1115) the additional data for the coalesced packet, and prepends (at 1120) this additional information to the packet. In some embodiments, this additional data provides information to the monitoring device (e.g., to which the packet is sent) regarding the copied packet data contained within the packet, such as the number of packets it contains, the length of each packet data portion, etc., as well as the identifier for the mirror buffer. The identifier, in some embodiments, is used by the egress pipeline of the forwarding element to process the packet (i.e., it may be used to identify the appropriate monitoring device and thus the appropriate output port and/or encapsulation headers for the coalesced packet).

Lastly, the process 1100 inserts (at 1125) the packet into the pipeline. As shown in FIG. 9, in some embodiments the mirror buffer inserts the packet into the end of one of the ingress pipelines (i.e., the deparser of the ingress pipeline). This allows the packet to be enqueued in the traffic manager and then processed by one of the egress pipelines of the forwarding element.

IV. Electronic System

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
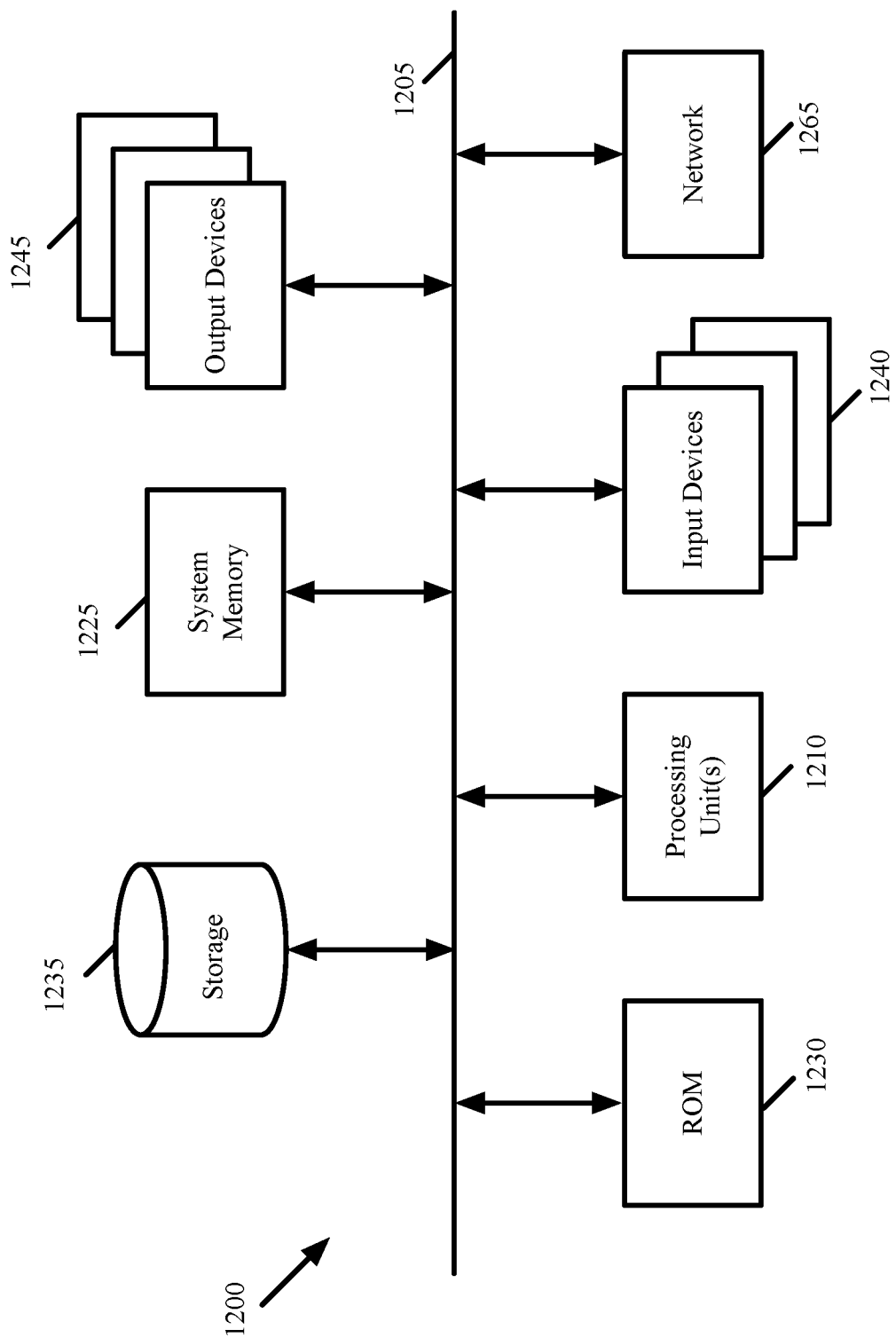
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 8 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method performed at a hardware forwarding element comprising a set of packet processing pipelines for processing packets, the method comprising:
   at a packet processing pipeline, determining that a packet is to be copied to a mirror buffer of the hardware forwarding element based on one or more characteristics of the packet;
   providing a copy of a portion of the packet from the packet processing pipeline for storage in the mirror buffer;
   continuing to process the packet in the packet processing pipeline;
   releasing the stored portion of the packet from the mirror buffer into the packet processing pipeline;
   forming a second packet from the released stored portion; and
   sending the formed second packet to a traffic monitor.

2. The method of claim 1, comprising:
   sending the packet to its next destination.

3. The method of claim 1, comprising:
   sending a copy of the portion of the packet to the mirror buffer based on a matched entry in a match action unit (MAU) of either an ingress or egress pipeline having a corresponding action entry that specifies to copy the portion of the packet to the mirror buffer.

4. The method of claim 3, wherein the action specifies copying X bits of a packet header to the mirror buffer.

5. The method of claim 3, wherein the action specifies to copy the packet to the mirror buffer and the mirror buffer determines what bits of the packet to store.

6. The method of claim 1, comprising:
   storing metadata for the packet to the mirror buffer, wherein the metadata comprises at least one of: a timestamp indicating a time that the packet was received, a latency duration, statistics information from a match stage that copies the packet to the mirror buffer, latency information about the packet, time that the packet spent in a queue between ingress and egress pipelines, or time that the packet was enqueued prior to entering an egress pipeline.

7. The method of claim 1, wherein forming a second packet from the released stored portion comprises:
   forming the second packet from the released stored portion, associated metadata and a stored portion of at least one other packet.

8. The method of claim 1, wherein forming a second packet from the released stored portion is based on expiration of a timer or filling of the mirror buffer.

9. The method of claim 1, wherein the packet processing pipeline comprises:
   a plurality of ingress pipelines and a plurality of egress pipelines and
   a traffic manager between the ingress pipelines and the egress pipelines.

10. A hardware forwarding element comprising:
    at least one mirror buffer and
    a packet processing pipeline to:
       determine whether a packet is to be copied to a mirror buffer of the hardware forwarding element based on one or more characteristics of the packet;
       provide a copy of a portion of the packet to store in a selected mirror buffer;
       process the packet;
       receive the stored portion of the packet from the selected mirror buffer for the packet processing pipeline to process; and
       form a second packet from the stored portion of the packet for transmission to a traffic monitor.

11. The hardware forwarding element of claim 10, wherein the packet processing pipeline comprises:
    a plurality of ingress pipelines and a plurality of egress pipelines and
    a traffic manager between the ingress pipelines and the egress pipelines.

12. The hardware forwarding element of claim 10, comprising one or more ingress and egress ports.

13. The hardware forwarding element of claim 10, wherein the packet processing pipeline is to provide the packet for transmission to its next destination.

14. The hardware forwarding element of claim 10, wherein the packet processing pipeline is to:
    provide a copy of the portion of the packet to the selected mirror buffer based on a matched entry in a match action unit (MAU) of either an ingress or egress pipeline of the packet processing pipeline having a corresponding action entry that specifies to copy the portion of the packet to the selected mirror buffer.

15. The hardware forwarding element of claim 14, wherein the action is to specify copying X bits of a packet header to the selected mirror buffer.

16. The hardware forwarding element of claim 14, wherein the action is to specify copying the packet to the selected mirror buffer and the mirror buffer is to determine what bits of the packet to store.

17. The hardware forwarding element of claim 10, wherein the packet processing pipeline is to:
    store metadata for the packet to the mirror buffer, wherein the metadata comprises at least one of: a timestamp indicating a time that the packet was received, a latency duration, statistics information from a match stage that copies the packet to the mirror buffer, latency information about the packet, time that the packet spent in a queue between ingress and egress pipelines, or time that the packet was enqueued prior to entering an egress pipeline.

18. The hardware forwarding element of claim 10, wherein to form a second packet from the stored portion of the packet, the packet processing pipeline is to:
    form the second packet from the stored portion of the packet, associated metadata and a stored portion of at least one other packet.

19. The hardware forwarding element of claim 10, wherein the packet processing pipeline is to form a second packet from the stored portion of the packet based on expiration of a timer or filling of the mirror buffer.

20. The hardware forwarding element of claim 10, comprising a switch.

* * * * *